Apr. 24, 1923.
G. W. MARKOS
SAFETY PIN
Filed Aug. 21, 1922
1,452,747
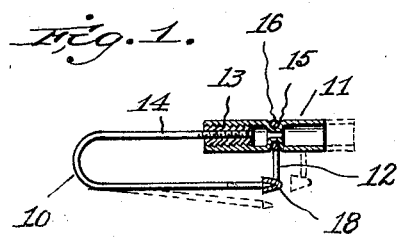
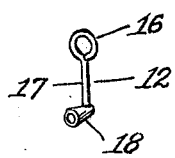
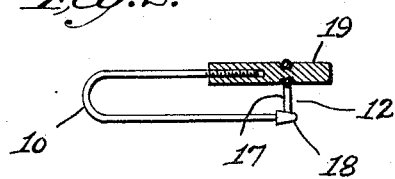
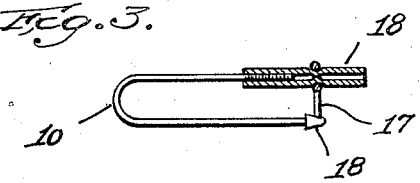
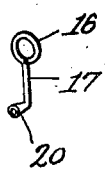
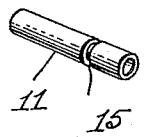
Inventor
Gus W. Markos
By Edwin L. Yewell
his Attorney Patented Apr. 24, 1923.

1,452,747

UNITED STATES PATENT OFFICE.

GUS W. MARKOS, OF COLUMBUS, OHIO.

SAFETY PIN.

Application filed August 21, 1922. Serial No. 583,073.

*To all whom it may concern:*

Be it known that I, GUS W. MARKOS, a citizen of the United States, residing at Columbus, in the county of Franklin and State of Ohio, have invented certain new and useful Improvements in Safety Pins, of which the following is a specification.

This invention relates to improvements in safety-pins, and has for its objects to provide means on an article of this kind which will lock the guard upon the pin-point in a manner to prevent its accidental displacement, and consequently prevents the detachment of the pin from the garment, and also provide a pin simple in construction and operation which can be manufactured and sold for a minimum sum.

These and other objects hereinafter set forth are attained by the means illustrated in the accompanying drawing, in which:—

Figure 1 is a longitudinal sectional view of the improved device.

Figure 2 is a like view of a modified form.

Figure 3 is another similar view, showing a further modified form.

Figure 4 is a detail view showing the pin detached.

Figure 5 is a detail view showing the point guard-member, and

Figure 6 is another detail view showing a modified form of guard-member.

Similar reference numerals in all of the figures of the drawing designate like parts.

Referring to the drawing, 10 designates the pin member, 11 the head, and 12 the point guard-member. The pin member is substantially U-shaped and is preferably formed of resilient wire, so that normally its point-end will automatically spring from the guard member when the same is released from the point.

Head-member 11 is tubular, as shown in Figure 1, and has secured in one end in any suitable manner a plug 13 which is provided with an internally threaded opening which is adapted to engage the screw-threads on the supporting end 14 of the pin member. The head-member 11 is preferably indented or grooved intermediate its ends, (as shown at 15) to form a bearing for the eye 16 of the guard-member, the same being provided with a shank 17 extending from the eye 16, and on this free end of the shank 17 is formed or secured a point-guard 18 which has a conical recess adapted for the reception of the pin-point when in the locked position. Eye 16 is rotatably mounted on groove 15 so that the turning of the head will not disturb the position of the guard-member excepting in a direction longitudinal of the pin.

The form of head shown in Figure 3 is also tubular, (as shown at 18), and one end of the tube itself is screw-threaded for engagement with threads on the pin-member, instead of using the plug 13, as shown in Figure 1. In Figure 2 the head is shown solid, (as shown at 19), and the supporting end of the pin is directly engaged in opening in the solid head.

The guard-member shown in Figure 5 has the conical guard 18 at the free end of the shank secured to the shank in any suitable manner, while in Figure 6 the guard 20 is preferably formed integral with the shank by bending its lower end at an angle to the shank and expanding the free end to form the guard.

In the illustrations, the pin is shown in the locked position, and it is obvious that by manually turning the head, it will recede backwardly on the threaded end of the pin and at the same time carry the guard-member in the same direction and from engagement with the point of the pin.

It will thus be seen, an actual safety-pin is provided, and one which cannot be unfastened until the head is rotated.

Having thus fully described the invention, what is claimed is:—

1. A safety-pin, comprising a U-shaped pin member having a point at one end and screw-threaded at its other end, a head having a screw-threaded opening at one end adapted to travel on the screw-threads of the pin member, and a guard-member loosely mounted between shoulders on the head-member in a manner to travel longitudinally therewith and provided at its free end with a guard adapted to engage over the point of the pin member.

2. A safety-pin, comprising a U-shaped pin member having a point at one end and screw-threaded at its other end, a tubular head having a plug in one end provided with a screw-threaded opening adapted to travel on the screw-threads of the pin member, and a guard-member loosely mounted between shoulders on the head-member in a manner to travel longitudinally therewith and provided at its free end with a guard adapted to engage over the point of the pin-member.

In testimony whereof I affix my signature.

GUS W. MARKOS.